(12) United States Patent
Chan et al.

(10) Patent No.: US 11,430,256 B2
(45) Date of Patent: Aug. 30, 2022

(54) IMAGE SCORING AND IDENTIFICATION BASED ON FACIAL FEATURE DESCRIPTORS

(71) Applicant: Microsoft Technology Licensing, LLC, Redmond, WA (US)

(72) Inventors: Chunkit Jacky Chan, Redmond, WA (US); David Lee, Redmond, WA (US); Allison Light, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 16/813,284

(22) Filed: Mar. 9, 2020

(65) Prior Publication Data

US 2020/0210681 A1    Jul. 2, 2020

Related U.S. Application Data

(63) Continuation of application No. 15/692,494, filed on Aug. 31, 2017, now Pat. No. 10,607,062, which is a
(Continued)

(51) Int. Cl.
*G06F 16/00*    (2019.01)
*G06V 40/16*    (2022.01)
(Continued)

(52) U.S. Cl.
CPC .......... *G06V 40/16* (2022.01); *G06F 16/583* (2019.01); *G06V 20/30* (2022.01); *G06V 40/172* (2022.01)

(58) Field of Classification Search
CPC ........... G06K 9/00221; G06K 9/00677; G06K 9/00288; G06F 16/583
See application file for complete search history.

(56) References Cited

U.S. PATENT DOCUMENTS 6,556,196 B1    4/2003  Blanz et al.
6,606,096 B2    8/2003  Wang
(Continued)

FOREIGN PATENT DOCUMENTS

EP        2482572 A1      8/2012
KR    20080097235 A     11/2008
(Continued)

OTHER PUBLICATIONS

Nilsson et al., Mouth Open or Closed Decision for Frontal Face Images with Given Eye Locations. (Year: 2010).*
(Continued)

*Primary Examiner* — Syed H Hasan

(57) ABSTRACT

Technologies for grouping images, and ranking the images and the groupings, based on entities shown in the images. Images may be grouped based on faces shown in the images. Different images with faces that indicate the same entity (e.g., Adam) may be automatically grouped together. Different images with faces that indicate the same multiple entities (e.g., the people in my family) may also be automatically grouped together. Such automatic grouping may be based on facial recognition technologies. Further, images and groups of images may be automatically ranked based on the faces shown and entities represented. Such rankings may also be influenced by adjacent data that indicates family and friends and the like, and that can be used to identify such entities in the images.

20 Claims, 4 Drawing Sheets

Related U.S. Application Data continuation of application No. 14/264,619, filed on Apr. 29, 2014, now Pat. No. 9,773,156.

(51) Int. Cl.
*G06F 16/583* (2019.01)
*G06V 20/30* (2022.01)

(56) References Cited

U.S. PATENT DOCUMENTS

| | | | |
|---|---|---|---|
| 7,047,054 B2 | 5/2006 | Benni | |
| 7,130,453 B2 | 10/2006 | Kondo et al. | |
| 7,233,684 B2 | 6/2007 | Fedorovskaya et al. | |
| 7,460,730 B2 | 12/2008 | Pal et al. | |
| 7,599,519 B2 | 10/2009 | Yokouchi et al. | |
| 7,634,103 B2 | 12/2009 | Rubinstenn et al. | |
| 7,643,671 B2 | 1/2010 | Dong et al. | |
| 7,653,220 B2 | 1/2010 | Nishimori et al. | |
| 7,756,302 B2 | 7/2010 | Matsuzaka et al. | |
| 7,881,479 B2 | 2/2011 | Asada | |
| 8,031,775 B2 | 10/2011 | Luo et al. | |
| 8,194,938 B2 | 6/2012 | Wechsler et al. | |
| 8,375,456 B2 | 2/2013 | Li | |
| 8,384,714 B2 | 2/2013 | De Aguiar et al. | |
| 8,401,248 B1 | 3/2013 | Moon et al. | |
| 8,407,472 B2 | 3/2013 | Hao et al. | |
| 8,433,114 B2 | 4/2013 | Reisman et al. | |
| 8,538,072 B2 | 9/2013 | Mcmordie et al. | |
| 9,082,235 B2 | 7/2015 | Lau et al. | |
| 9,495,764 B1 | 11/2016 | Boardman et al. | |
| 2001/0026634 A1* | 10/2001 | Yamaguchi | G06K 9/6857 382/118 |
| 2002/0081003 A1* | 6/2002 | Sobol | G06T 5/00 382/118 |
| 2002/0081032 A1* | 6/2002 | Chen | G06T 7/12 382/199 |
| 2003/0021448 A1* | 1/2003 | Chen | G06K 9/00268 382/117 |
| 2003/0108225 A1* | 6/2003 | Li | G06K 9/00597 382/118 |
| 2003/0123713 A1* | 7/2003 | Geng | G06K 9/00288 382/118 |
| 2003/0182414 A1 | 9/2003 | O'Neill | |
| 2004/0042644 A1* | 3/2004 | Yuasa | G06K 9/00228 382/118 |
| 2004/0081338 A1* | 4/2004 | Takenaka | G08B 13/1961 382/118 |
| 2004/0133582 A1* | 7/2004 | Howard | G06V 40/16 |
| 2005/0105803 A1* | 5/2005 | Ray | G06F 16/5838 382/209 |
| 2006/0036965 A1 | 2/2006 | Harris et al. | |
| 2009/0185723 A1* | 7/2009 | Kurtz | G06K 9/00926 382/118 |
| 2010/0121954 A1 | 5/2010 | Yang et al. | |
| 2010/0162226 A1 | 6/2010 | Borissov et al. | |
| 2010/0287053 A1 | 11/2010 | Ganong et al. | |
| 2011/0081023 A1 | 4/2011 | Raghuvanshi | |
| 2012/0243751 A1 | 9/2012 | Zheng et al. | |
| 2012/0288167 A1 | 11/2012 | Sun et al. | |
| 2013/0011083 A1* | 1/2013 | Berkovich | G06F 16/285 382/305 |
| 2014/0075523 A1 | 3/2014 | Tuomaala | |
| 2015/0117786 A1* | 4/2015 | James | G06T 5/005 382/195 |
| 2015/0213305 A1* | 7/2015 | Sundstrom | H04N 5/23218 382/118 |
| 2015/0242404 A1* | 8/2015 | Underwood, IV | G06F 3/0482 707/748 |

FOREIGN PATENT DOCUMENTS

| | | |
|---|---|---|
| KR | 20090051181 A | 5/2009 |
| KR | 20100016358 A | 2/2010 |

OTHER PUBLICATIONS

Long et al., Near Infrared Face Image Quality Assessment System of Video Sequences. (Year: 2011).*
"Office Action Issued in Indian Patent Application No. 201647042852", dated Jul. 31, 2020, 6 Pages.
"Office Action Issued in Indian Patent Application No. 201647038515", dated Jun. 18, 2020, 7 Pages.
"Notice of Allowance Issued in U.S. Appl. No. 16/388,102", dated Apr. 1, 2021, 9 Pages.
"Office Action Issued in European Patent Application No. 15726780.8", dated Nov. 24, 2020, 6 Pages.
"Non Final Office Action Issued in U.S. Appl. No. 16/388,102", dated Nov. 19, 2020, 9 Pages.
"Non Final Office Action Issued in U.S. Appl. No. 16/388,102", dated Sep. 15, 2020, 7 Pages.
"Office Action Issued in Korean Patent Application No. 10-2016-7031505", dated Jun. 16, 2021, 5 Pages.
"Non Final Office Action Issued in U.S. Appl. No. 16/388,102", dated Jul. 16, 2021, 7 Pages.
"Office Action Issued in Korean Patent Application No. 10-2016-7031483", dated Jan. 11, 2021, 5 Pages.
"Non Final Office Action Issued in U.S. Appl. No. 16/388,102", dated Jan. 8, 2021, 6 Pages.
"Non Final Office Action Issued in U.S. Appl. No. 16/388,102", dated Jan. 21, 2021, 6 Pages.
"Office Action Issued in European Patent Application No. 15724882.4", dated Feb. 20, 2020, 6 Pages.
"Office Action Issued in European Patent Application No. 15726780.8", dated Mar. 5, 2020, 7 Pages.
Keshtkar, et al., "A Corpus-Based Method for Extracting Paraphrases of Emotion Terms", In Proceedings of the NAACL HLT Workshop on Computational Approaches to Analysis and Generation of Emotion in Text, Jun. 5, 2010, pp. 35-44.
Malony, et al., "Overhead Compensation in Performance Profiling", In Lecture Notes in Computer Science vol. 3149, Oct. 2004, pp. 119-132.
"International Search Report and Written Opinion Issued in PCT Application No. PCT/US2014/041023", dated Jun. 3, 2015, 16 Pages.
"International Search Report and Written Opinion Issued in PCT Application No. PCT/US2015/027409", dated Jul. 22, 2015, 13 Pages.
"International Search Report and Written Opinion Issued in PCT Application No. PCT/US2015/028383", dated Jul. 24, 2015, 13 Pages.
"International Search Report and Written Opinion Issued in PCT Application No. PCT/US2015/030153", dated Aug. 7, 2015, 12 Pages.
"International Search Report and Written Opinion Issued in PCT Application No. PCT/US2015/032089", dated Jul. 31, 2015, 11 Pages.
"Summons to Attend Oral Proceedings Issued in European Patent Application No. 15728297.1", Mailed Date: Mar. 13, 2020, 8 Pages.
"Notice of Allowance Issued in Korean Patent Application No. 10-2016-7031505", dated Oct. 5, 2021, 3 Pages.
Summons to Attend Oral Proceedings Issued in European Patent Application No. 15721468.5, Mailed Date: Sep. 16, 2021, 10 Pages.
"Notice of Allowance Issued in U.S. Appl. No. 16/388,102", dated Dec. 8, 2021, 8 Pages.

* cited by examiner

IMAGE SCORING AND IDENTIFICATION BASED ON FACIAL FEATURE DESCRIPTORS

RELATED APPLICATIONS

This Application is a continuation of and claims benefit of priority to U.S. patent application Ser. No. 14/264,619 filed on Apr. 29, 2014 and U.S. patent application Ser. No. 15/692,494 filed on Aug. 31, 2017, both of which are incorporated herein by reference in their entirety.

BACKGROUND

Thanks to advances in imaging technologies, people take more pictures than ever before. Further, the proliferation of media sharing applications has increased the demand for picture sharing to a greater degree than ever before. Yet the flood of photos, and the need to sort through them to find relevant pictures, has actually increased the time and effort required for sharing pictures. As a result, it is often the case that either pictures that are less than representative of the best pictures, or no pictures at all, end up getting shared.

Most people have many pictures or videos that include different people (or other entities) including family, friends, acquaintances, and strangers. In many cases, not all entities are treated equally when deciding the importance of image. For example, images that show family and friends are typically treated as more important than images that show mostly strangers or the like. But sorting through today's large number of images to select the more important ones can be prohibitively time-consuming.

SUMMARY

The summary provided in this section summarizes one or more partial or complete example embodiments of the invention in order to provide a basic high-level understanding to the reader. This summary is not an extensive description of the invention and it may not identify key elements or aspects of the invention or delineate the scope of the invention. Its sole purpose is to present various aspects of the invention in a simplified form as a prelude to the detailed description provided below.

The invention encompasses technologies for grouping images, and ranking the images and the groupings, based on entities shown in the images. Images may be grouped based on faces shown in the images. Different images with faces that indicate the same entity (e.g., Adam) may be automatically grouped together. Different images with faces that indicate the same multiple entities (e.g., the people in my family) may also be automatically grouped together. Such automatic grouping may be based on facial recognition technologies. Further, images and groups of images may be automatically ranked based on the faces shown and entities represented. Such rankings may also be influenced by adjacent data that indicates family and friends and the like, and that can be used to identify such entities in the images.

Many of the attendant features will be more readily appreciated as the same become better understood by reference to the detailed description provided below in connection with the accompanying drawings.

DESCRIPTION OF THE DRAWINGS

The detailed description provided below will be better understood when considered in connection with the accompanying drawings, where.

Like-numbered labels in different figures are used to designate similar or identical elements or steps in the accompanying drawings.

DETAILED DESCRIPTION

The detailed description provided in this section, in connection with the accompanying drawings, describes one or more partial or complete example embodiments of the invention, but is not intended to describe all possible embodiments of the invention. This detailed description sets forth various examples of at least some of the technologies, systems, and/or methods invention. However, the same or equivalent technologies, systems, and/or methods may be realized according to examples as well.

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
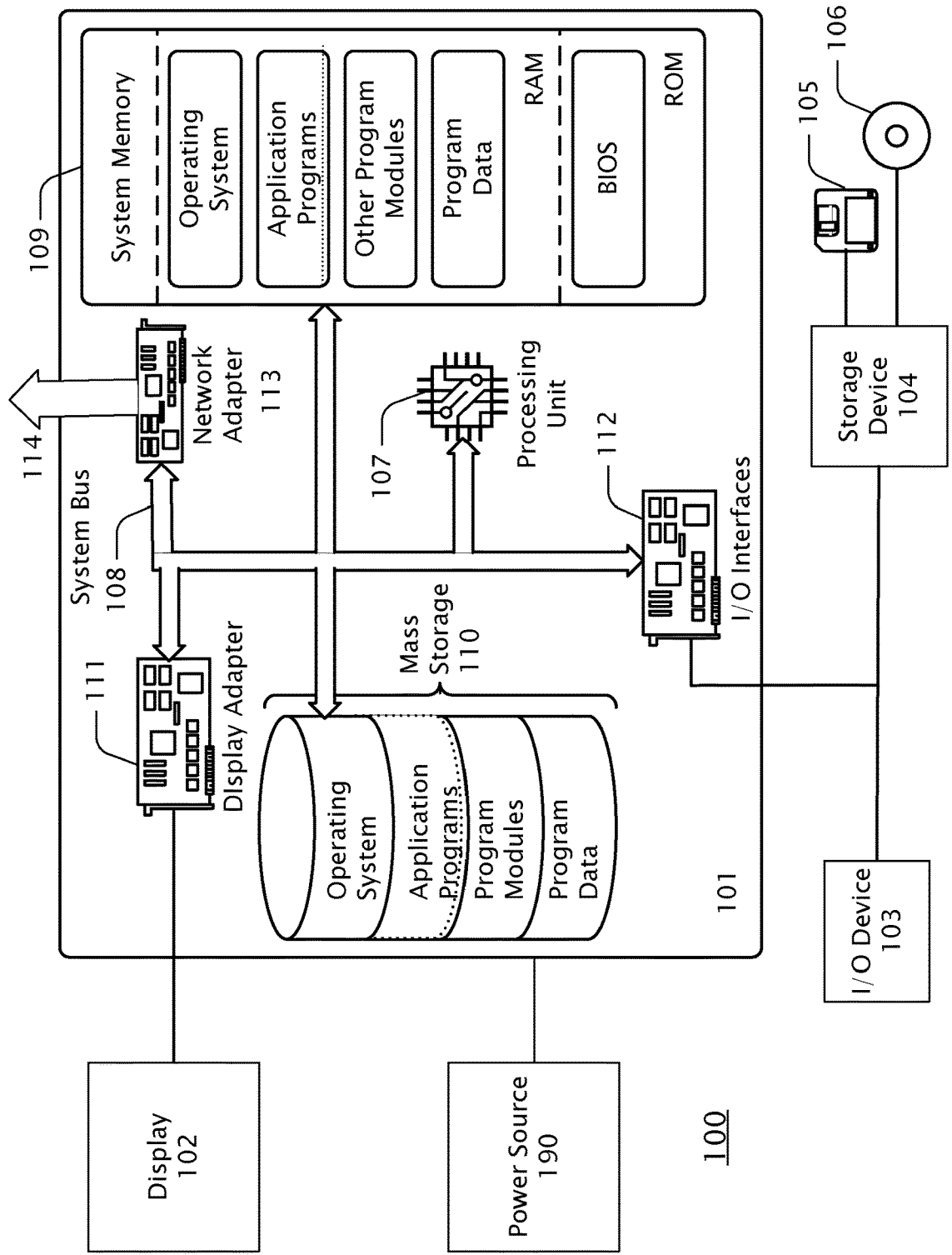
FIG. 1 is a block diagram showing an example computing environment in which the invention described herein may be implemented.

FIG. 1 is a block diagram showing an example computing environment 100 in which the invention described herein may be implemented. A suitable computing environment may be implemented with numerous general purpose or special purpose systems. Examples of well known systems include, but are not limited to, cell phones, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes a general-purpose computing system in the form of a computing device 101 coupled to various components, such as peripheral devices 102, 103, 101 and the like. These may include components such as input devices 103, including voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("GPU"), microprocessors ("µP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like.

System memory 109 may include computer-readable media in the form of volatile memory, such as random-access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/or program modules comprising computer-executable instructions that are immediately accessible to and/or presently operated on by one or more of the processors 107.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, tape storage devices, and the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may not include many of the components described in connection with FIG. 1. For example, an electronic badge may be comprised of a coil of wire along with a simple processing unit 107 or the like, the coil configured to act as power source 190 when in proximity to a card reader device or the like. Such a coil may also be configured to act as an antenna coupled to the processing unit 107 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, program modules, or the like maintained in an electronic device such as a ROM. The term "software" generally refers to computer-executable instructions, code, data, applications, programs, program modules, or the like maintained in or on any form or type of computer-readable media that is configured for storing computer-executable instructions or the like in a manner that is accessible to a computing device. The term "computer-readable media" and the like as used herein is strictly limited to one or more apparatus, article of manufacture, or the like that is not a signal or carrier wave per se. The term "computing device" as used in the claims refers to one or more devices such as computing device 101 and encompasses client devices, mobile devices, one or more servers, network services such as an Internet service or corporate network service, and the like, and any combination of such.

Figure 2:
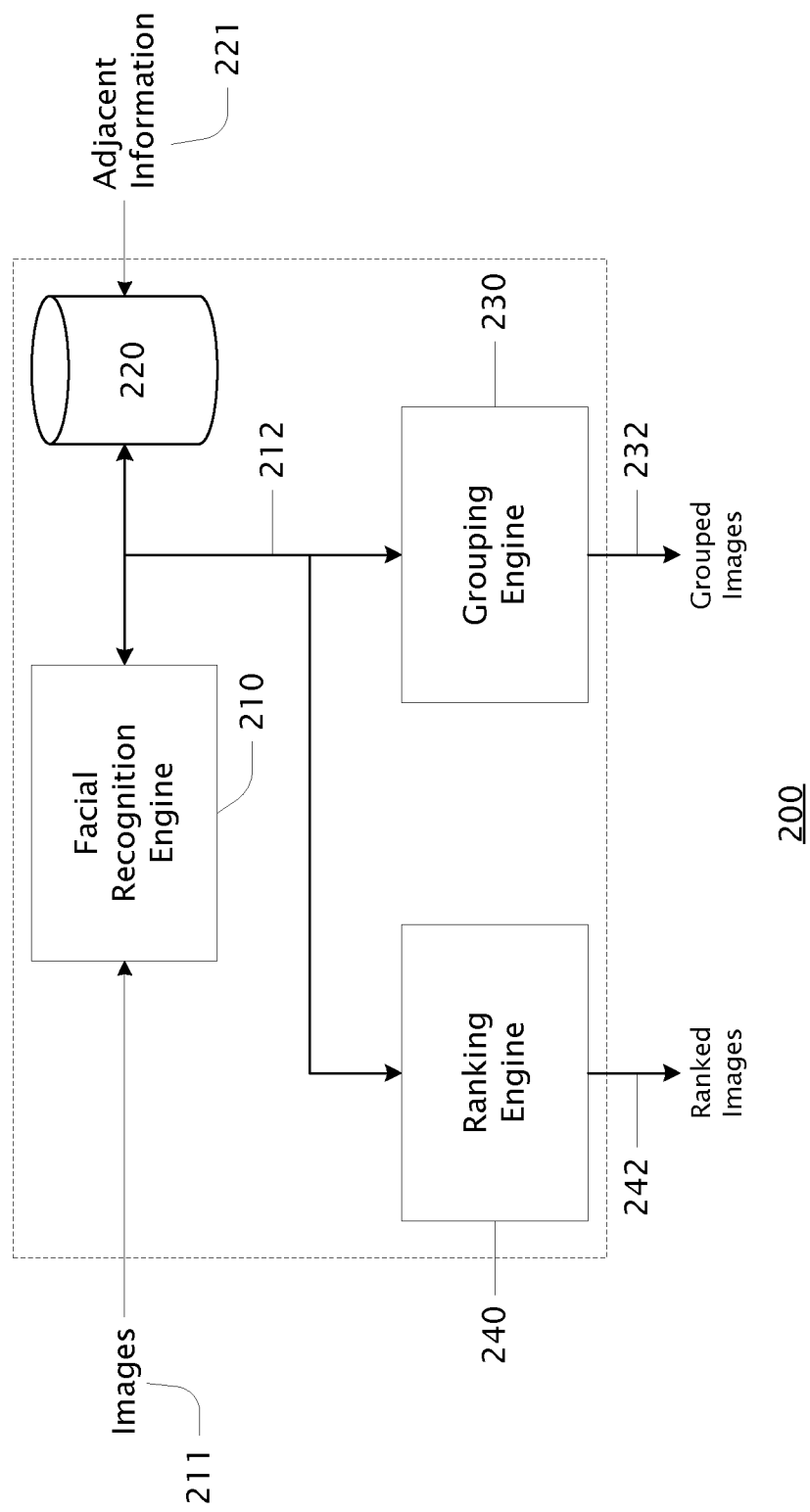
FIG. 2 is a block diagram showing an example system configured for recognizing faces in a set of images, and grouping and ranking the images and/or the groupings of the images.

FIG. 2 is a block diagram showing an example system 200 configured for recognizing faces in a set of images, and grouping and ranking the images and/or the groupings of the mages. Such rankings may be based on a frequency of the faces and/or face signatures. The system may include several modules such as facial recognition engine 210 that accepts input 211 and provides output 212, data store 220, grouping engine 230 that accepts input 212 and produces output 232, and ranking engine 240 that accepts input 212 and produces output 242. Each of these modules (including any sub-modules) may be implemented in hardware, firmware, software (e.g., as program modules comprising computer-executable instructions), or any combination thereof. Each such module may be implemented on/by one device, such as a computing device, or across multiple such devices. For example, one module may be implemented in a distributed fashion on/by multiple devices such as servers or elements of a network service or the like. Further, each such module (including any sub-modules) may encompass one or more sub-modules or the like, and the modules may be implemented as separate modules, or any two or more may be combined in whole or in part. The division of modules (including any sub-modules) described herein in non-limiting and intended primarily to aid in describing aspects of the invention. The phrase "face in the image" and the like refers not to an actual face in an image, but to an image or representation of a face, actual or otherwise.

In summary, system 200 is configured for detecting faces in input images 211, generating a face identifier for each detected face in the set of images, grouping images that include faces of the same entity, and ranking images and/or groups of images based on the faces detected in the images. A set of images is typically provided by one or more sources as input 212 to the system. Such sources include camera phones, digital cameras, digital video recorders ("DVRs"), computers, digital photo albums, social media applications, image and video streaming web sites, and any other source of digital images. Note that one or more actual images may be input, or references to images, or any combination of such. Further, the phrase "grouping images", adding an image to a group", and the like as used herein include grouping actual images, grouping references to images, and/or any combination of the foregoing.

Facial recognition engine 210 is a module that accepts an image as input 212, detects one or more faces in the image, and detects various features in recognized faces. In one example, the functionality of module 210 may be provided in the form of a software development kit ("SDK"). In one example, facial recognition engine 210 may provide facial recognition data as one or more outputs, each of which may be stored in data store 220. One output may be in the form of a face identifier that identifies a detected face in an image 212. Given multiple detected faces in an image, a unique face identifier is typically provided for each face detected in the image. In one example, a face identifier may be a RECT data structure or the like that bounds certain aspects of the face it identifies. Such a RECT data structure may indicate a position in the image of the face it identifies, and/or may indicate a size or relative size of the identified face in the image. Any face identifier(s) that are output 212 may be accepted as input by data store 220, grouping engine 230, and/or ranking engine 240.

Another output 212 of facial recognition engine 210 may be in the form of a set of facial feature descriptors that describe facial features detected in a face corresponding to the face's identifier. Given multiple face identifiers as input, a corresponding set of facial feature descriptors is typically provided for each face identifier. In one example, the set of facial feature descriptors may be in the form of coordinates for each detected facial feature, such as the eyes, eyebrows, nose, and mouth of the face.

Another output 212 of facial recognition engine 210 may be in the form of a face score corresponding to a face identifier. Such a face score may be an overall quality score for the face that is based on facial feature analysis. In one example, the score may be a value between zero and one. In other examples, the score may be represented by a value within a continuous range, or by a quantization such as high, medium, or low, or the like. In one example, the face score may represent an overall measure of the quality of the face in the image, and may be based on a combination of analyzed aspects such as face sharpness, face expression, face pose, proximity to image edges, open/closed state of the face's eyes and mouth, and/or other aspects.

Another output 212 of facial recognition engine 210 may be in the form of a face signature that, across the images in the set, uniquely identifies an entity that the face represents, at least within the scope of the detected features. For example, if various face shots of Adam appear in several images in a set, then each of Adam's face shots will have the same face signature that uniquely identifies the entity "Adam", at least within the scope of the detected features. Such a face signature is typically based on analysis of a face's identifier and corresponding set of facial feature descriptors. Such face signatures may be used to determine other faces in other images of the set that represent the same entity, and thus may be used to determine a frequency that a particular entity appears in the image set. The term "same entity" as used herein typically refers to a particular entity (e.g., a person).

Another output 212 of facial recognition engine 210 may be the set of images provided as input 211. One or more of these images, and/or references to them, may be stored in data store 220. Further, such images may also be retrieved as input 211 to facial recognition engine 210, as may any other of the outputs 212 stored in data store 220. Note that the movement of an image described herein, such as providing, retrieving, or the like, refers to movement of the actual image itself and/or to a reference to the actual image.

One example of facial recognition engine 210 is provided as system 200 described in U.S. patent application Ser. No. 14/266,795 entitled "RATING PHOTOS FOR TASKS BASED ON CONTENT AND ADJACENT SIGNALS" that was filed on Apr. 30, 2014 and that is incorporated herein by reference in its entirety.

Data store 220 is a persistent data store such as one or more database and/or other storage system. Data store 220 may be integral to system 200 or may be separate. Further, adjacent information input 221 from adjacent information sources may be provided to system 200 via data store 220, or may be provided directly to system 200 without necessarily being stored in data store 220. Adjacent information may be obtained from sources that are generally unrelated or indirectly related to the images in the set. In general, any system or data source that can be accessed by system 200 may be an adjacent information source. Non-limiting examples of adjacent information sources include calendars, social media applications, news sources, blogs, email, location tracking information, and any other source.

Grouping engine 230 is a module that accepts one or more of the outputs of facial recognition engine 210 directly and/or from data store 220. Grouping engine 230 may group images that include one or more faces with the same face signature. For example, if the first and third images in a set of images both include a face with the same face signature, then those two images may be grouped together, along with any other images in the set that include a face with the same face signature. Thus, each image in the group includes at least one face that represents the same entity as the other images in the group. Faces with a face score below a certain threshold may be excluded from the grouping as if not present in the image in which they are detected.

Grouping engine may also analyze face information from an image, such as a face identifier and/or the corresponding set of facial feature descriptors. The results of such analysis may be used separate from or in addition to face signatures in the grouping of images.

Groups that share faces of a single entity in common may be described as single-entity groups. Groups that share faces of two different entities in common may be described as double-entity groups, and so forth. For example, each image in a set may each show the same family of five people. In this example, all images in the set may be grouped together in a five-entity group because each image share five face signatures in common, one for each member of the family. Such a five-entity group may be described as a larger-entity group than a single-entity group or a four-entity group, and so forth.

Images without detected faces may be grouped together. Images with one or more detected faces that do not share face signatures with faces in any other images may be grouped by themselves.

Groupings of images produced by grouping engine 230 may be provided as output 232. Such provided groups may comprise the images themselves, or may be comprised of references to the images, or any combination of the foregoing. Such groupings may be automatically provided, such as being presented in photo albums, shared via social media applications, or the like. Priority in presenting such groupings may be given to groupings with larger numbers of images, and/or to larger-entity groups.

Ranking engine 240 is a module that accepts one or more of the outputs of facial recognition engine 210 directly and/or from data store 220, and/or groupings of images provided by grouping engine 230. Ranking engine 240 may rank images that include one or more faces based on face scores of the faces detected in the image. Faces with a score below a certain threshold may be excluded from the rankings as if not present in the image in which they are detected. Such scores may be weighted to reflect the relative importance of various faces and/or face aspects in the image. For example, faces with a higher frequency of appearance in the set of images may be weighted higher than those with a lower frequency of appearance, such as determined by face signatures and/or groupings. Further, faces of entities that are determined to be friends or family or the like of a person providing the set of images may be weighted higher than faces of entities that are not so determined. In one example, such a determination may be based on adjacent information input 221, or based on other input to system 200 such as input provided by the person or other entity.

Ranking engine 240 may also rank groupings of images based on the faces of the common entities in the images in the groupings. For example, larger-entity groupings may be ranked higher than smaller-entity groupings. Further, groupings with a larger number of faces of entities that are determined to be friends or family or the like may be ranked higher than groupings with a lesser number of such.

Rankings of images produced by ranking engine 240 may be provided as output 242. Such provided rankings may comprise the images themselves, or may be comprised of references to the images, or any combination of the foregoing. Such rankings may be automatically provided, such as being presented in photo albums, shared via social media applications, or the like.

Figure 3:
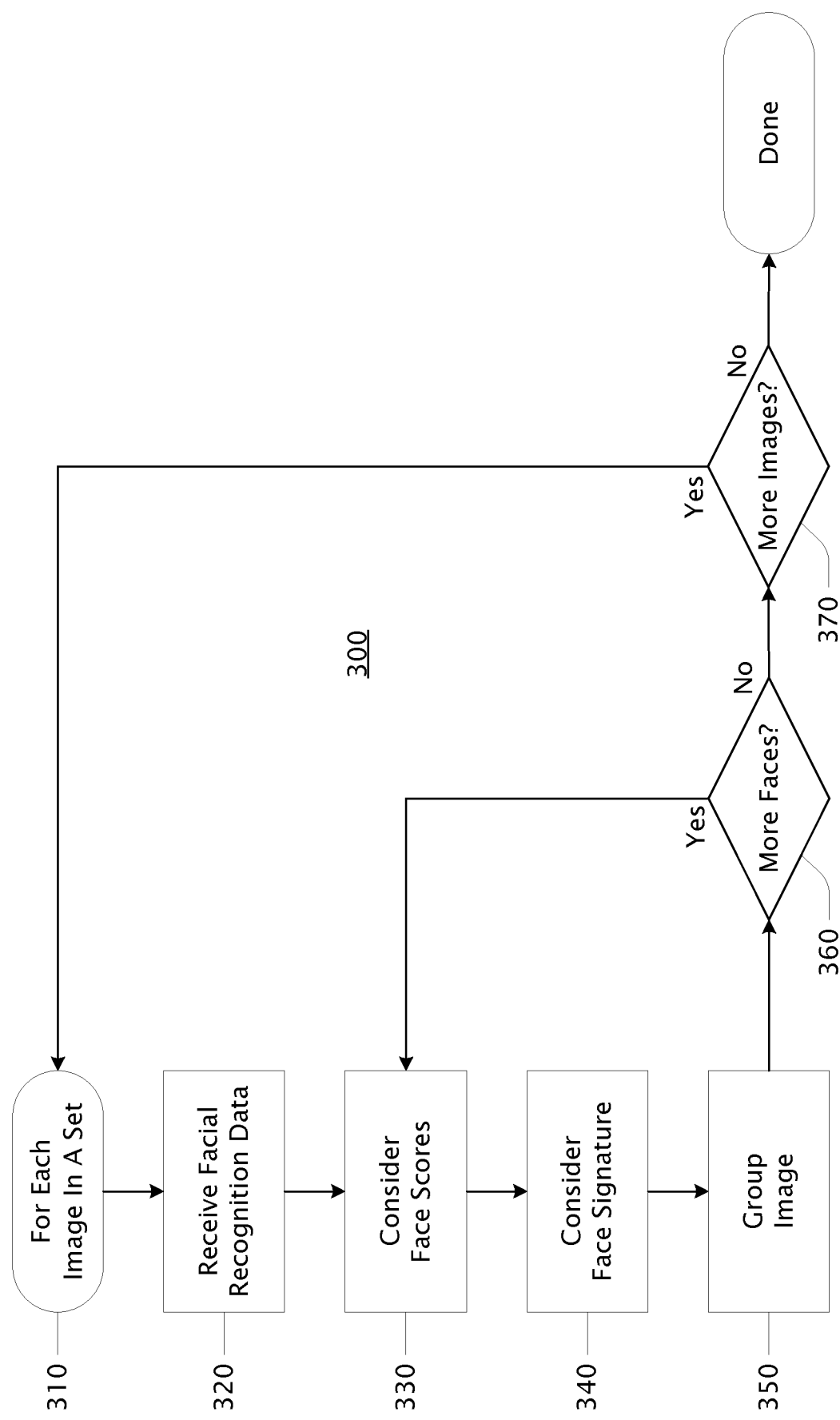
FIG. 3 is a block diagram showing an example method for grouping images.

FIG. 3 is a block diagram showing an example method 300 for grouping images. Such a method may be performed by grouping engine 230 or the like. Block 310 typically indicates performing the steps of method 300 for each image in a set of images, such as provided at input 211 or the like. In other examples, the steps may be performed in an order different than that shown, and/or one or more steps may be omitted or combined with other steps.

Block 320 typically indicates receiving facial recognition data for a face detected in an image. Such data may include a face identifier, a set of facial feature descriptors, and face score, and/or a face signature. The image and/or a reference to the image may also be provided. Once the facial recognition data is received, method 300 typically continues at block 330.

Block 330 typically indicates considering a face score of the face corresponding to the received face identifier. Such a face score may be received at step 320 as part of the facial recognition data. In one example, the face score may be weighted. If the face score, with or without its weight, is below a certain threshold, then the face may be dropped from grouping consideration. In this case, method 300 continues at block 360. Otherwise, method 300 typically continues at block 340.

Block 340 typically indicates considering a face signature of the face corresponding to the received face identifier. Such a face signature may be received at step 320 as part of the facial recognition data. Note that the face signature indicates an entity that the face represents. In one example, the face signature is compared to that of any existing group(s). If no existing group is associated with the face signature, then a new group is created for that face signature, and the image is added to that group (step 350). For each existing group that is associated with the face signature, the image is added to that group (step 350). In this example, single-entity groups are created and filled.

For example, if the face signature indicates the entity "Adam", and no group for mages with faces of Adam exists, then a group is created for images with faces of Adam, and the mage is added. If a group for faces of Adam already exists, then the image with Adam's face is added to the Adam group (step 350). The term "single-entity group" as used herein refers to a group of images where each image in the group includes a detected face that represents the same entity.

In another example, if the image with the face signature indicating Adam is also associated with a face signature indicating "Mary", then the image is also added (step 350) to any existing group for Adam and Mary, or to a newly-created group if one does not already exist, and so forth for each additional face signature associated with the image. In this example, multi-entity groups are created and filled. Once the face signature(s) is considered and the image is added to the appropriate group(s), then the method typically continues at step 360. The term "multi-entity group" as used herein refers to an n-entity group of images where each image in the group includes a detected face that represents each of the same n entities. In one example, given a three-entity group with several images, each image includes three detected faces, one that represents each of Adam, Mary, and Jim.

Block 360 typically indicates determining if any more faces are present in the image. In one example, this determination is made based on the facial recognition data received at step 320. If there are additional faces in the image that have not yet been considered (e.g., based on a face identifier), then the method typically continues at step 330 for one of the yet-to-be considered faces in the image. Otherwise, the method typically continues at step 370.

Block 370 typically indicates determining if any more images are present in the set of images. If there are additional images in the set that have not yet been considered, then the method typically continues at step 310 for one of the yet-to-be considered images in the set. Otherwise, the method is typically done.

Figure 4:
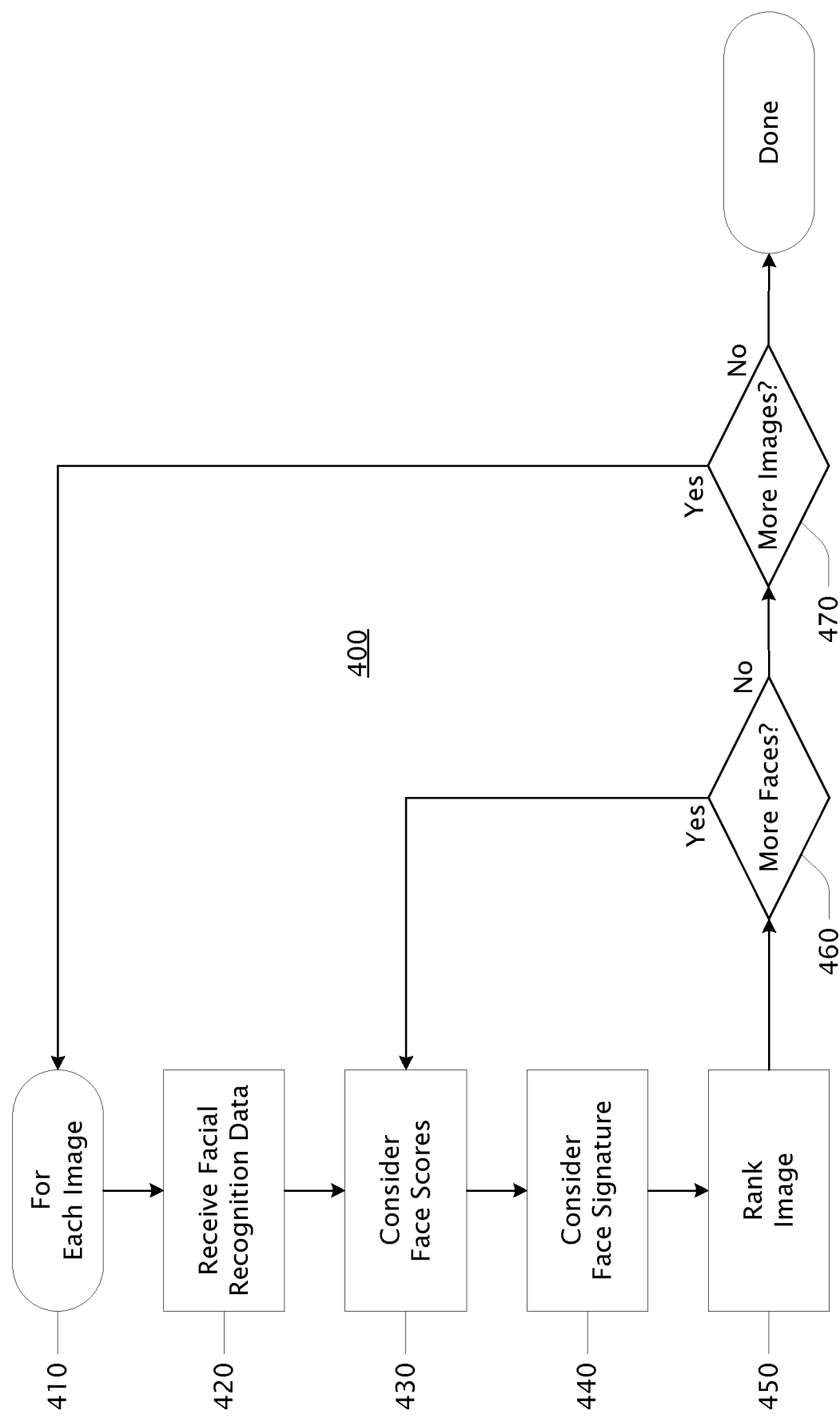
FIG. 4 is a block diagram showing an example method for ranking images and/or groups of images.

FIG. 4 is a block diagram showing an example method 400 for ranking images and/or groups of images. Such a method may be performed by ranking engine 240 or the like. Block 410 typically indicates performing the steps of method 400 for each face detected in an image and/or a set of images, such as provided at input 211 or the like. In other examples, the steps may be performed in an order different than that shown, and/or one or more steps may be omitted or combined with other steps.

Block 420 typically indicates receiving facial recognition data for a face detected in an image. Such data may include a face identifier, a set of facial feature descriptors, and face score, and/or a face signature. The image and/or a reference to the image may also be provided. Once the facial recognition data is received, method 400 typically continues at block 430.

Block 430 typically indicates considering a face score of the face corresponding to the received face identifier. Such a face score may be received at step 420 as part of the facial recognition data. In one example, the face score may be weighted. If the face score, with or without its weight, is below a certain threshold, then the face may be dropped from ranking consideration. In this case, method 400 continues at block 460. Otherwise, method 400 typically continues at block 440.

Block 440 typically indicates considering a face signature of the face corresponding to the received face identifier. Such a face signature may be received at step 420 as part of the facial recognition data. Note that the face signature indicates an entity that the face represents. The face signature may be used to determine a frequency at which faces of a particular entity appears in an image or group of images. In one example, the face signature of an entity is associated with a count of detected faces in an image and/or a group of images that correspond to the entity. Facial recognition engine 210 may provide such a count given the face signature and an image, set of images, and/or grouping of images, or references thereto.

For example, if the face signature indicates the entity "Adam", and the face signature is associated with a larger number of detected faces in the image and/or group of images, then the image and/or group may be ranked higher than if the face signature is associated with a lesser number of such detected faces (step 450).

In another example, if the image with the face signature indicating Adam is also associated with a face signature indicating "Mary", then the image is a multi-entity image. In this example, multi-entity images with detected faces of a larger number of entities may be ranked higher than multi-entity images with a lesser number of such detected faces (step 450). In a similar fashion, multi-entity groups with a larger number of entities may be ranked higher than multi-entity groups with a lesser number of entities.

In yet another example, the rankings may be weighted by or based on the face signature indicating an entity determined to be a friend or family or the like. In this example, images and/or groups of images with a larger number of friends or family or the like may be ranked higher that images and/or groups of images with a lesser number of such.

The ranking of images or groups of images may be in the form of a relative rank between the images or groups. In another example, the ranking may be in the form of a score or priority assigned to each image or group.

Once the face signature is considered, then the method typically continues at step 460. Further, rankings may be finalized after all detected faces in an image and/or group of images, or all face signatures associated with an image and/or group of images, have been processed. For example, ranking information may have been accumulated for each considered face and/or each considered face signature. Such accumulated rankings may then be consolidated into a single ranking for an image and/or group of images. In one example, a sum or product of such accumulated rankings may be assigned as a finalized ranking to an image and/or group of images.

Block 460 typically indicates determining if any more faces are present in the image. In one example, this determination is made based on the facial recognition data received at step 420. If there are additional faces in the image that have not yet been considered (e.g., based on a face identifier), then the method typically continues at step 430 for one of the yet-to-be considered faces in the image. Otherwise, the method typically continues at step 470.

Block 470 typically indicates determining if any more images need to be considered, such as when processing a group of images as opposed to an individual image. If there are additional images that have not yet been considered, then the method typically continues at step 410 for one of the yet-to-be considered images. Otherwise, the method is typically done.

In view of the many possible embodiments to which the invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device comprising:
 receiving, by the computing device, digital image comprised of pixels;
 detecting, by the computing device, a face in the image based on values of pixels within the digital image and location coordinates of the pixels within the digital image;

generating, by the computing device, a set of facial feature descriptors including coordinates describing shapes of the face's eyes and mouth within the image, wherein individual facial feature descriptors describe individual features that differ from features described by other facial feature descriptors in the set of facial feature descriptors, the set of facial feature descriptors comprising multiple facial feature descriptors that describe multiple features of the detected face;

generating, by the computing device, a face score based on an open/closed state of the face's eyes and mouth and that indicates an overall quality of the face; and assigning, by the computing device, a face signature that uniquely identifies an entity that the face represents using the set of facial feature descriptors.

2. The method of claim 1, further comprising:
detecting a second face within the image;
generating a second set of facial feature descriptors including coordinates for the second face's eyes and mouth within the image;
generating a second face score based on an open/closed state of the second face's eyes and mouth and that indicates an overall quality of the second face; and
assigning a second face signature that uniquely identifies an entity that the face represents using the set of facial feature descriptors.

3. The method of claim 2, wherein the face signature and the second face signature are different when the face and the second face depict different entities.

4. The method of claim 2, wherein the face signature and the second face signature are the same when the face and the second face depict the same entity.

5. The method of claim 1, further comprising:
assigning a unique face identifier to the detected face.

6. The method of claim 5, wherein the face identifier includes one or both of a position and a relative size of the detected face in the image.

7. The method of claim 1, further comprising:
outputting facial recognition data that includes one or more of the set of facial feature descriptors, the face score, the face signature, and the received image to one or more of a data store, a grouping engine, and a ranking engine.

8. The method of claim 1, wherein the set of facial feature descriptors further includes coordinates for one or both of the face's eyebrows and nose within the image.

9. The method of claim 1, wherein the face score is further based on one or more of face sharpness, face expression, face pose, and face proximity to an edge of the image.

10. A system including a computing device and a facial recognition engine that together are configured to perform actions comprising:
receiving digital image comprised of pixels;
detecting a face in the image based on values of pixels within the digital image and location coordinates of the pixels within the digital image;
generating a set of facial feature descriptors including coordinates describing shapes of the face's eyes and mouth within the image, wherein individual facial feature descriptors describe individual features that differ from features described by other facial feature descriptors in the set of facial feature descriptors, the set of facial feature descriptors comprising multiple facial feature descriptors that describe multiple features of the detected face;

generating a face score based on an open/closed state of the face's eyes and mouth and that indicates an overall quality of the face; and
assigning a face signature that uniquely identifies an entity that the face represents using the set of facial feature descriptors.

11. The system of claim 10, further configured to perform an action comprising:
assigning a unique face identifier to the detected face.

12. The system of claim 10, further configured to perform an action comprising:
outputting facial recognition data that includes one or more of the set of facial feature descriptors, the face score, the face signature, and the received image to one or more of a data store, a grouping engine, and a ranking engine.

13. A method performed on a computing device comprising:
receiving, by the computing device, a set of digital images, each digital image being comprised of pixels;
detecting, by the computing device, multiple faces within the set of images based on values of pixels within each digital image and location coordinates of the pixels within each digital image;
generating, by the computing device, a set of facial feature descriptors including coordinates describing shapes of eyes and mouth for each detected face within the set of images, wherein individual facial feature descriptors describe individual features that differ from features described by other facial feature descriptors in the set of facial feature descriptors, the set of facial feature descriptors comprising multiple facial feature descriptors that describe multiple features of each detected face;
generating, by the computing device, a face score based on an open/closed state of the eyes and mouth and that indicates an overall quality of each detected face;
assigning, by the computing device, a face signature to each detected face that uniquely identifies an entity that each detected face represents across the set of images using the set of facial feature descriptors.

14. The method of claim 13, wherein the face signatures are different when depicting different entities and the face signatures are the same when depicting the same entity.

15. The method of claim 13, further comprising:
assigning a unique face identifier to each detected face.

16. The method of claim 13, further comprising:
outputting facial recognition data that includes one or more of the set of facial feature descriptors, the face score, and the face signature for each of the received images to one or more of a data store, a grouping engine, and a ranking engine.

17. The method of claim 13, further comprising:
determining a frequency of occurrence of each assigned face signature within the set of images.

18. The method of claim 13, further comprising:
grouping, based on the face signatures, at least a portion of the images in the set of images into a set of groups, each image within a group including a detected face that depicts the same entity.

19. The method of claim 18, further comprising:
ranking, based on the face scores, images within each of the set of groups.

20. The method of claim 18, further comprising:
ranking each of the set of groups based on a number of entities depicted in each group.

\* \* \* \* \*